United States Patent [19]

Shindo et al.

[11] Patent Number: 4,908,644
[45] Date of Patent: Mar. 13, 1990

[54] OPTICAL FILTERING DEVICE AND METHOD FOR USING THE SAME

[75] Inventors: Osamu Shindo; Noboru Suzuki; Shigeo Toji, all of Tokyo, Japan

[73] Assignee: Asahi Kogaku Kogyo K.K., Tokyo, Japan

[21] Appl. No.: 171,794

[22] Filed: Mar. 22, 1988

[30] Foreign Application Priority Data

Mar. 23, 1987 [JP] Japan .................................. 62-68541

[51] Int. Cl.⁴ .......................... G03B 3/00; G06F 7/38; G06F 15/336
[52] U.S. Cl. ..................................... 354/402; 382/42; 364/724.12; 364/728.02
[58] Field of Search ............... 354/402, 406, 407, 408; 250/201 PF; 364/572, 604, 728.01, 728.02, 724.12, 819, 825; 382/42, 49

[56] References Cited

U.S. PATENT DOCUMENTS

| | | | |
|---|---|---|---|
| 4,133,606 | 1/1979 | Hosoe et al. | 354/402 |
| 4,179,696 | 12/1979 | Quesinberry et al. | 343/7.4 |
| 4,329,588 | 5/1982 | Barrett et al. | 250/445 T |
| 4,330,833 | 5/1982 | Pratt et al. | 382/42 |
| 4,331,877 | 5/1982 | Barrett et al. | 250/445 T |
| 4,375,081 | 2/1983 | Blesser | 364/724 |
| 4,473,286 | 9/1984 | Watanabe et al. | 354/406 |
| 4,474,446 | 10/1984 | Reynolds et al. | 354/402 |
| 4,497,561 | 2/1985 | Suzuki | 354/408 X |
| 4,561,747 | 12/1985 | Ohno et al. | 354/402 |
| 4,561,749 | 12/1985 | Utagawa | 354/406 |
| 4,634,851 | 1/1987 | Ogasawara et al. | 354/408 X |
| 4,720,871 | 1/1988 | Chambers | 364/728.01 X |

FOREIGN PATENT DOCUMENTS

| | | |
|---|---|---|
| 59-142506 | 8/1984 | Japan . |
| 59-160109 | 9/1984 | Japan . |
| 59-204808 | 11/1984 | Japan . |
| 60-037513 | 2/1985 | Japan . |
| 60-061713 | 4/1985 | Japan . |

OTHER PUBLICATIONS

Computer printout results of an Orbit search session conducted on Aug. 18, 1988, and directed to general subject matter of the above-identified application.

*Primary Examiner*—W. B. Perkey
*Attorney, Agent, or Firm*—Sandler & Greenblum

[57] ABSTRACT

A filtering device for carrying out a filtering process in a space domain of image data derived from an external visual image input means and then delivering control information to a controlled driving device with the filtering device containing fundamental operator generation device for generating fundamental operators within the same fundamental operator series, and a filtering processing device for carrying out a convolution of a fundamental operator with an image data array and conducting a sequential series of such convolutions with varying input data based upon data detected at the output of the filter processing, so that the sequential convolution attains an effect equivalent to that attained by the direct convolution of the initial image data array with an expanded operator.

26 Claims, 13 Drawing Sheets

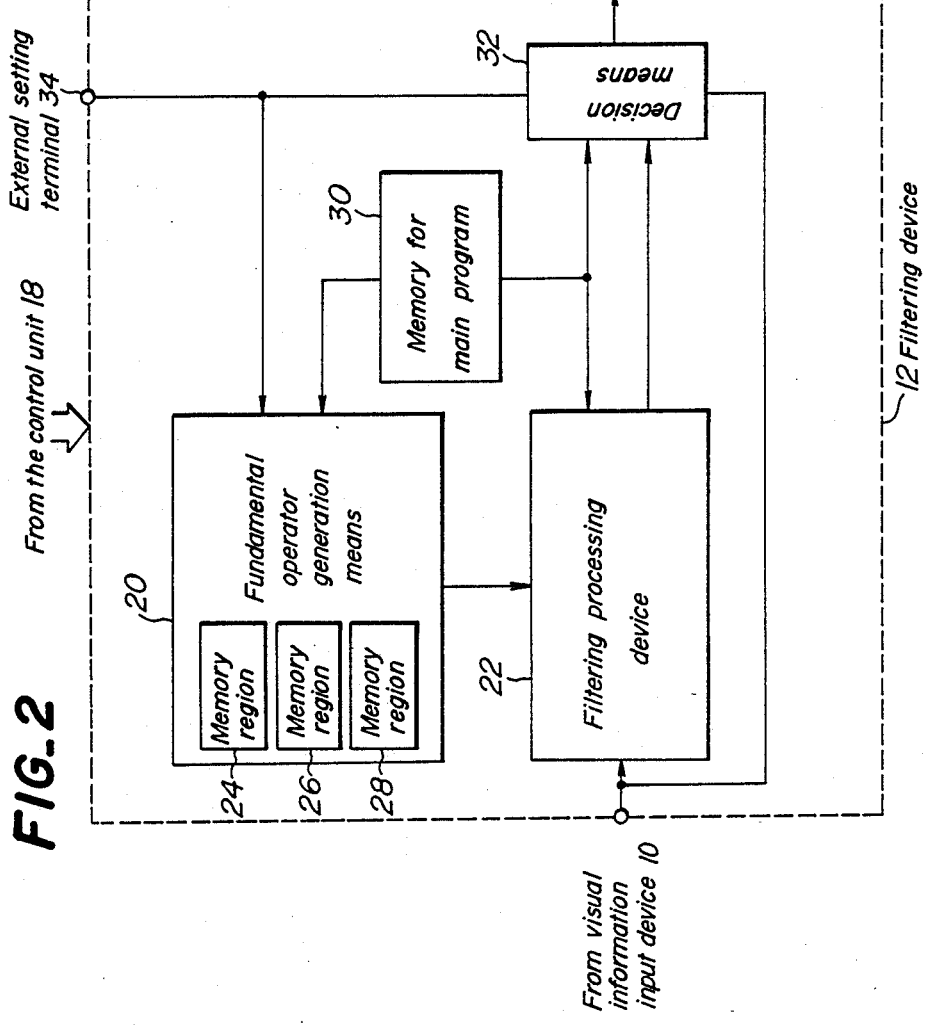

FIG._3A
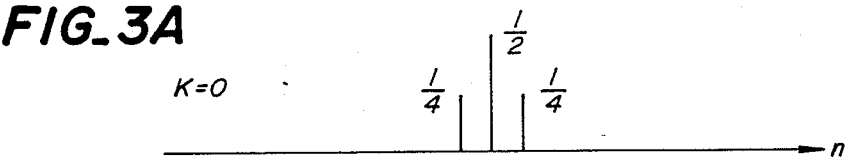
FIG._3B
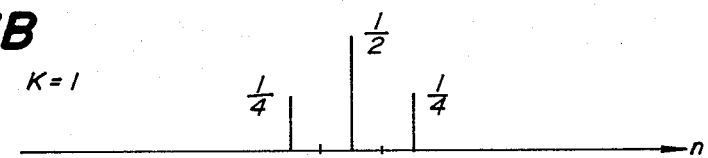
FIG._3C
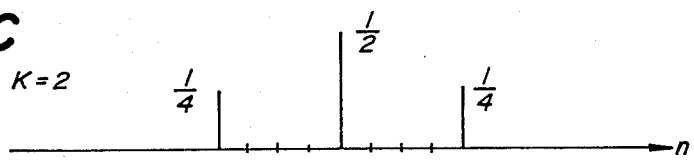
FIG._3D
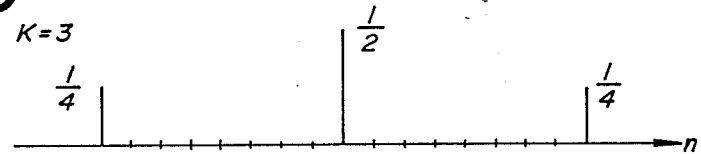

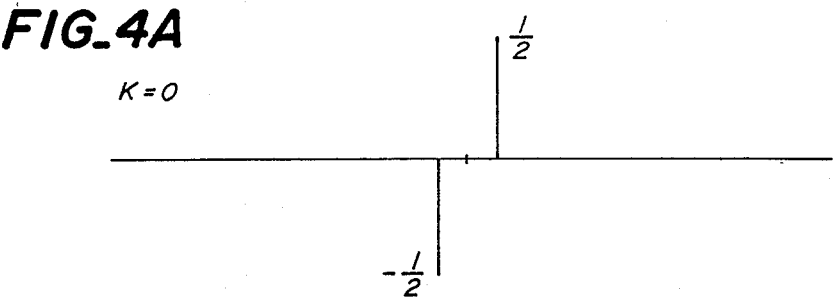
FIG._4A
K = 0
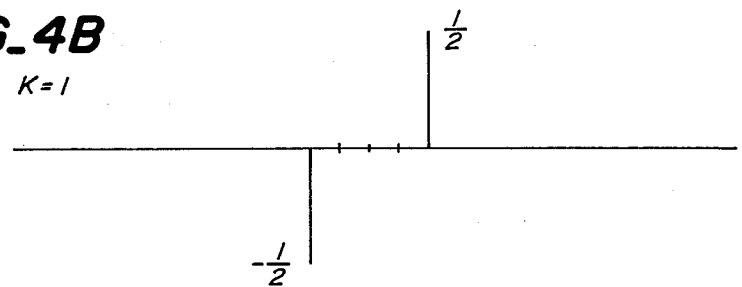
FIG._4B
K = 1
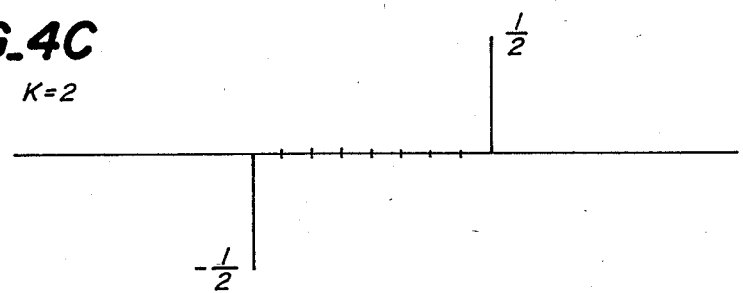
FIG._4C
K = 2
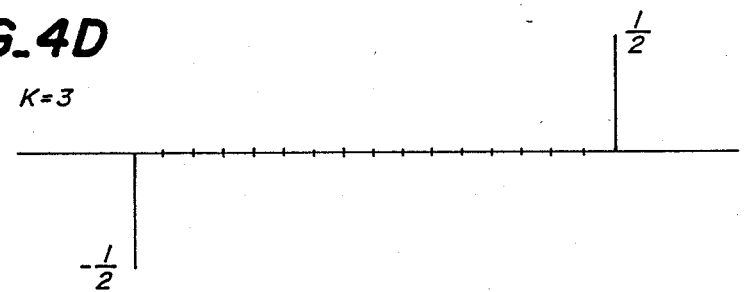
FIG._4D
K = 3

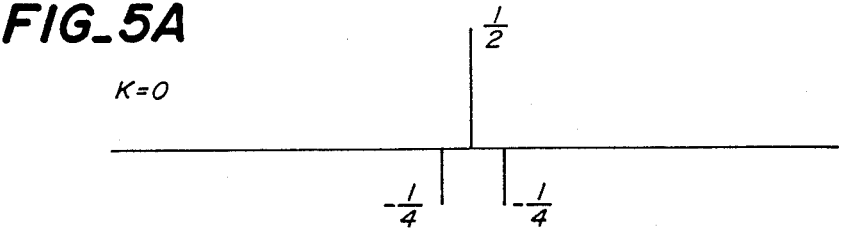
FIG_5A  K=0
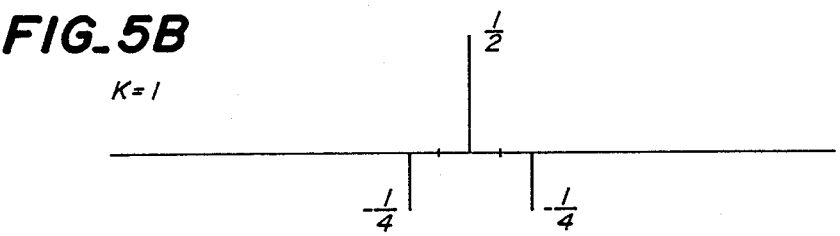
FIG_5B  K=1
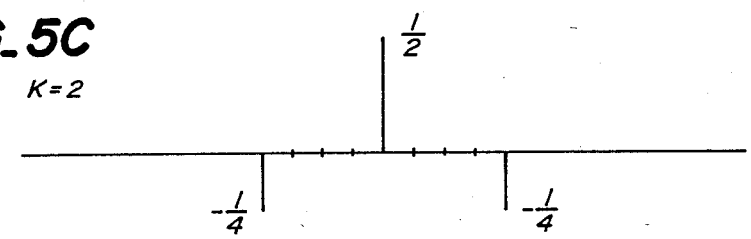
FIG_5C  K=2
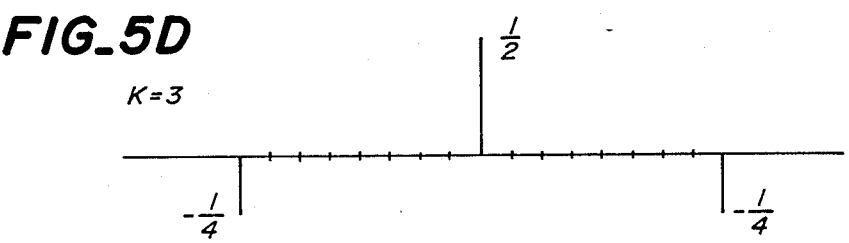
FIG_5D  K=3

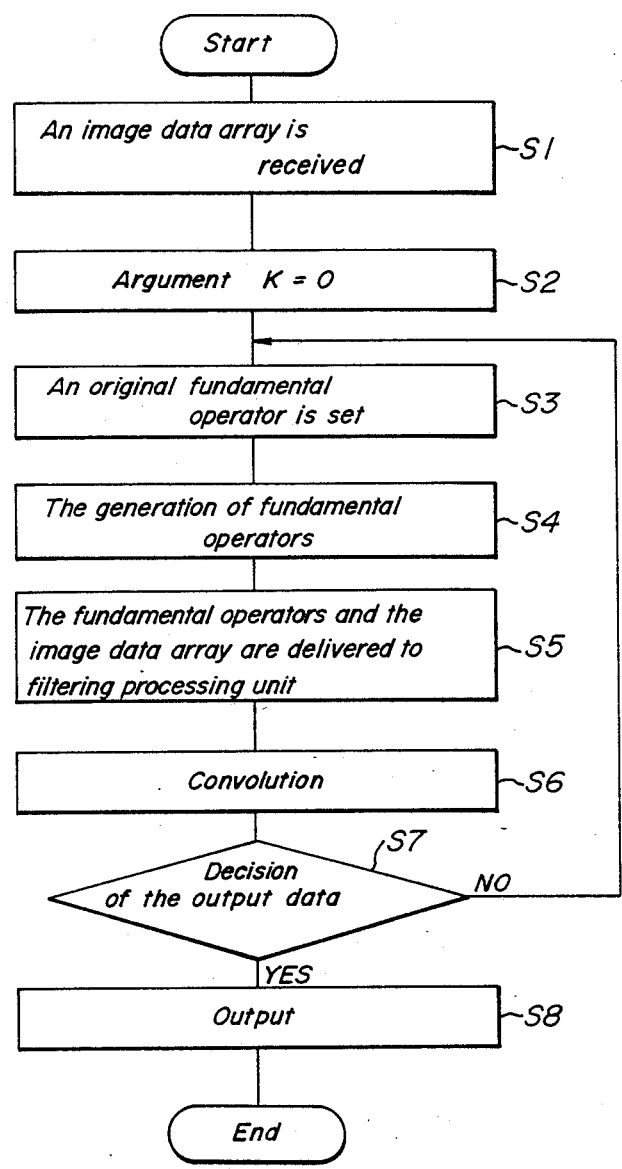
FIG_6

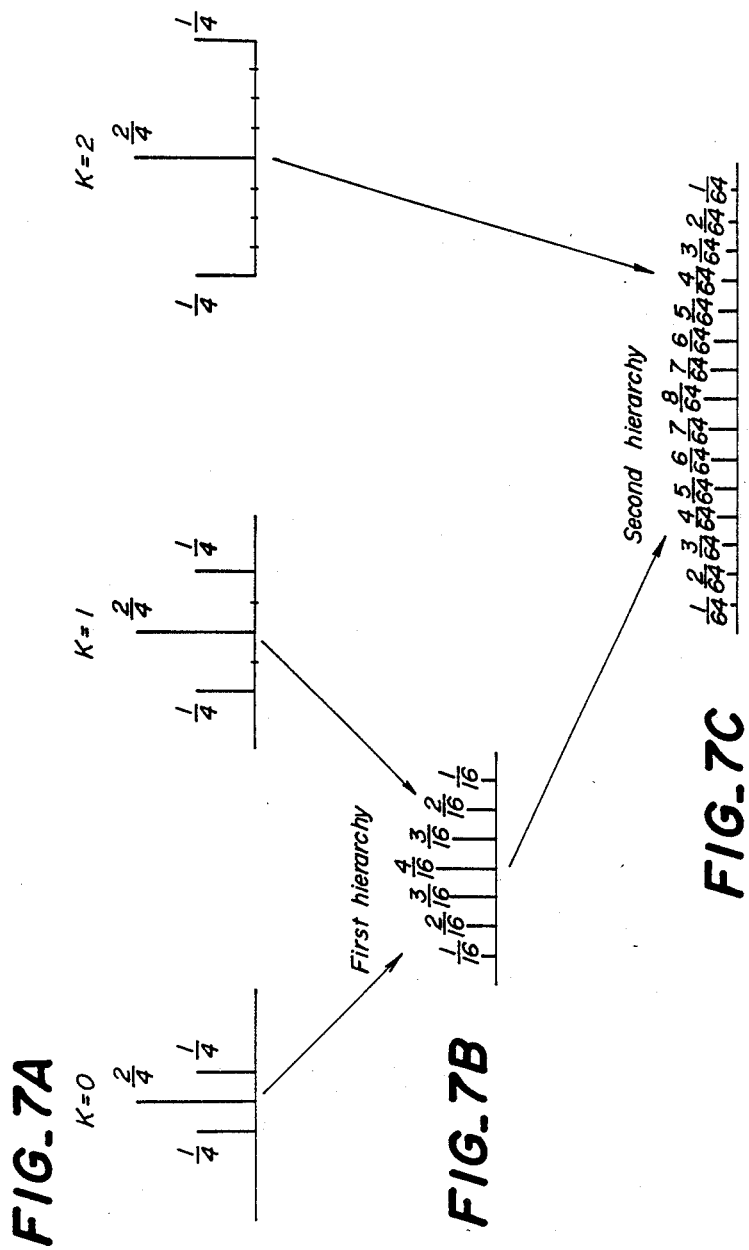

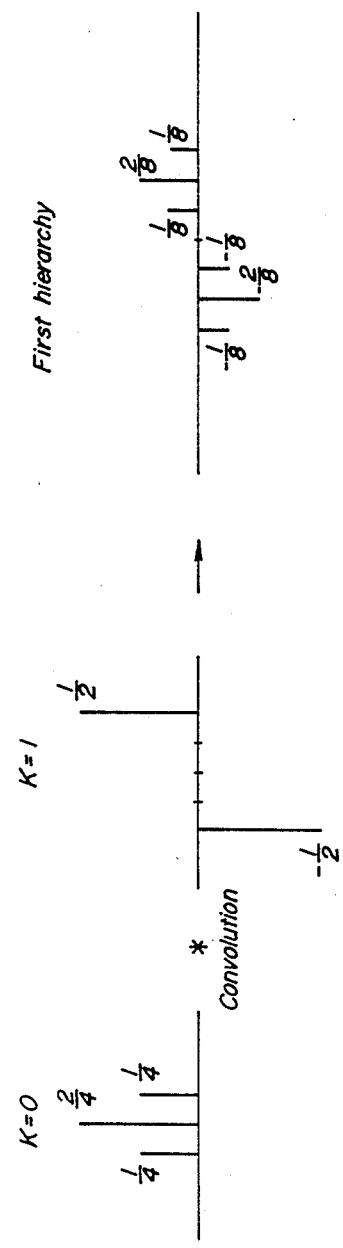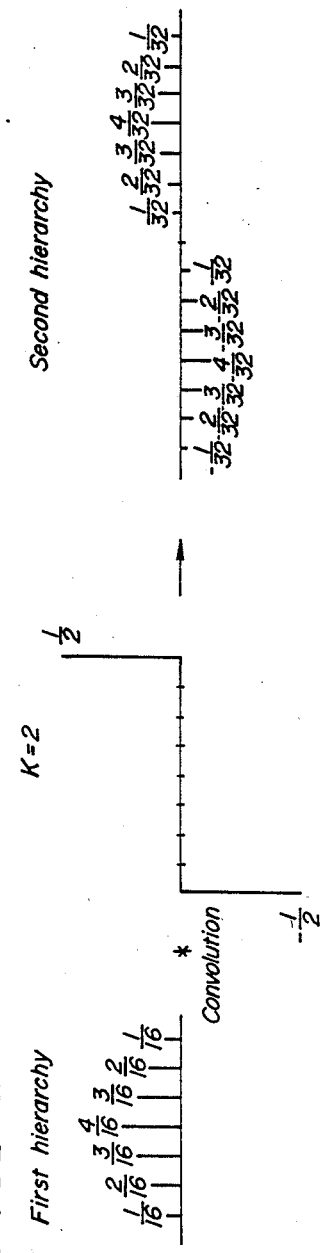

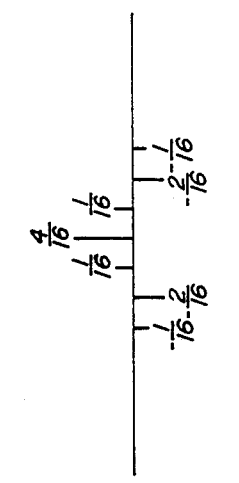
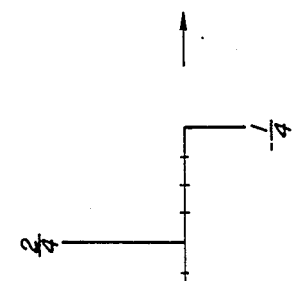
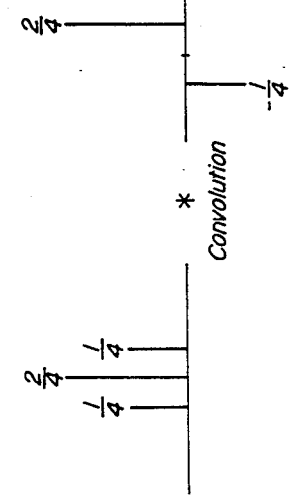
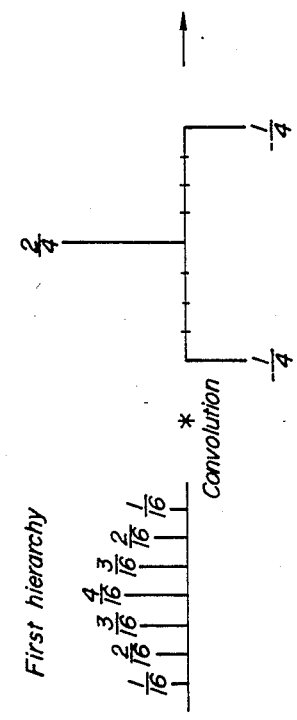
FIG_9A
FIG_9B

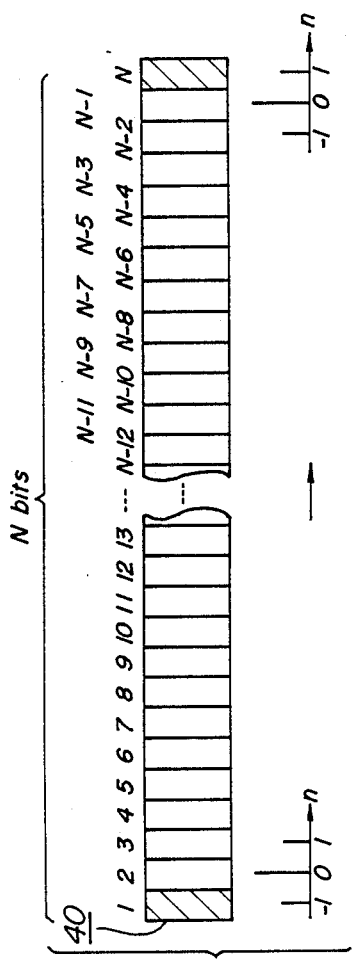
FIG._IOA
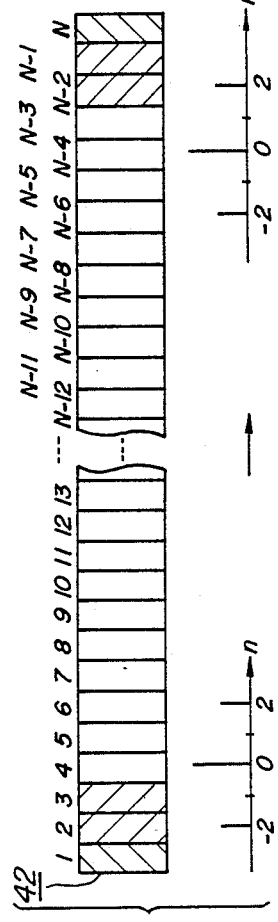
FIG._IOB
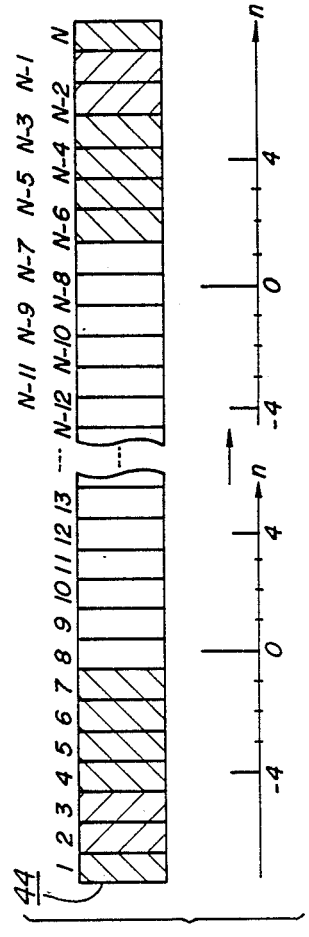
FIG._IOC

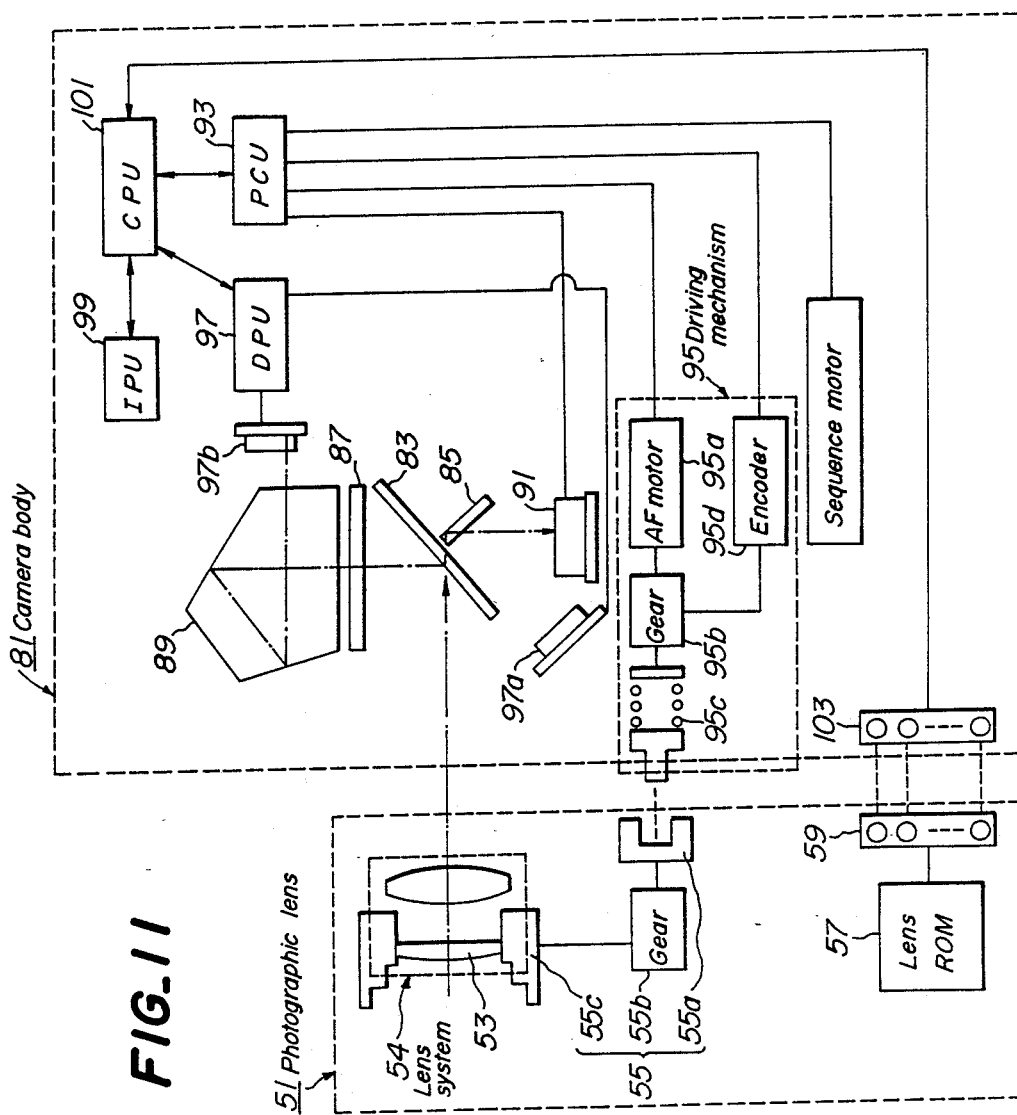

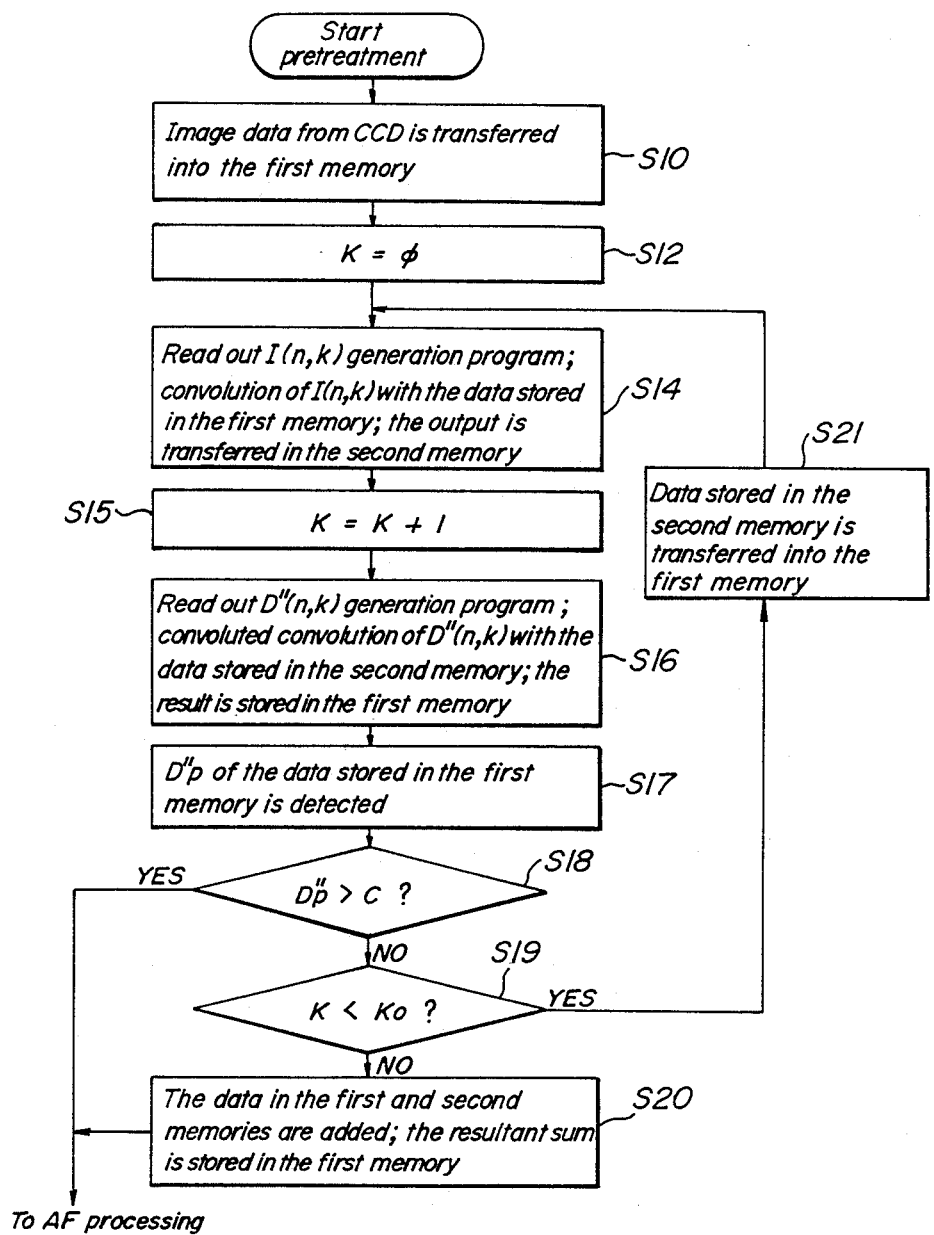
FIG_13

OPTICAL FILTERING DEVICE AND METHOD FOR USING THE SAME

BACKGROUND OF THE DISCLOSURE

1. Technical Field of the Invention

This invention relates to an optical filtering device and method for using the same for processing images, and more particularly to a filtering device used in the space domain, e.g., the device can be used in an auto-focus system for a camera.

2. Discussion of Background Art

The development of image processing techniques by use of computers is quite popular and is now widely used. Conventional image processing systems are used for extracting desired information from a visual image for emphasizing a selected major portion of the extracted information, and for extracting features after the pretreatment process has been carried out.

The basic steps involved in such image processing systems are as illustrated in FIG. 1, where the sample image or video data array from an external visual information input device 10 is applied to filtering device 12. The image data array is filtered by device 12 whose output data are delivered to post-processing device 14 and then to a controlled driving device 16. The filtering device 12 and the post-processing device 14 are each controlled by control unit 18. In this type of image processing system, the filtering technique used in the filtering device plays an important role in the pretreatment stage of the image processing system.

As is well-known by those skilled in the art, the optical filtering techniques available are generally divided into two categories, i.e., "spatial frequency filtering" which is accomplished in a spatial frequency region, and "space-domain filtering" (or "space-region filtering") which is accomplished in a space domain (or space region).

The spatial frequency filtering technique can be achieved by taking the Fourier transform of a series of image information data, which is hereinafter referred to as an "image data series" or an "image data array" Such an image data array can be obtained, for example, by photographing an object. The image data array thus obtained is then subjected to the spatial frequency filtering technique by first taking the Fourier transform of the image data array to obtain Fourier-transformed data, multiplying the Fourier-transformed data by a spatial frequency filter, and thereafter taking its inverse Fourier transform. However, with use of this technique, a large number of arithmetic operations are necessary and a large storage capacity is needed, so that a low performance microprocessor cannot accomplish real-time processing using this technique. Therefore, spatial frequency filtering techniques are not capable of use with apparatus equipped with a low-capacity storage device.

On the other hand, the space-domain filtering technique can be carried out by the convolution of previously prepared operators, sometimes referred to as "window operators", with an image data array. Therefore, space domain filtering techniques of this type are more easily achieved than are spatial frequency filtering techniques.

Therefore, efforts have been made to apply space-domain filtering techniques to various equipment, such as the automatic focusing device of a camera. However, conventional space-domain filtering techniques have various problems of their own which heretofore have made their use unsatisfactory in such applications.

In conventional space-domain filtering techniques, one program is used/prepared to produce or generate operators having one meaningful function. Conventional operators are utilized in these programs, which operators are stored in memory; and no new operators are generated. Filtering processing is effected in these techniques by convolution of the operator generated by the program with the image data array obtained. Accordingly, in systems/techniques in which many different specific operators are required for performing various processes, e.g., differentiation, integration, and emphasis, operators for each of the required functions must be previously prepared. As a result, generation programs equal in number to the number of convolutions are required, creating a problem in that a large capacity program device, capable of storing a few kilobytes, and accordingly a large storage device capable of storing a large number of generation programs, are both required Furthermore, conventional space-domain filtering techniques use coefficients of the element functions (which will be described later) forming operators with values selected to be "0.44" or "0.14", and this adversely affects the arithmetic operations that are necessary to be carried out by the computer. As a result, there is an increased number of arithmetic operations, requiring a large storage device; this introduces yet another problem, which is the long time period required to carry out the arithmetic operations and to accomplish the filtering process. For example, where the convolution of one operator is carried out with a large image data array, the number of arithmetic operations becomes extremely large for obtaining the desired convolution, and hence a long delay time is involved in the process.

SUMMARY OF THE INVENTION

The basic principals that apply to the generation of an expanded operator from a fundamental operator are as follows.

In order to facilitate consideration of the following description, numerous terms used throughout this specification will first be defined. As used herein, a fundamental operator is an operator consisting of no more than three element functions; and an expanded operator is an operator obtained as a result of the convolution of a plurality of fundamental operators.

As used herein, a fundamental operator series is a sequential set of fundamental operators, wherein the coefficient array of element functions which comprise the fundamental operators are the same. For example, as shown in FIGS. 3A, 3B, 3C, and 3D, the coefficient array of the element function is $\frac{1}{4}$, $\frac{1}{2}$, and $\frac{1}{4}$ for any value of variable integer K where K=0, K=1, K=2, and K=3. In the example of FIGS. 4A, 4B, 4C, and 4D, the coefficient array of the element function is $-\frac{1}{2}$ and $\frac{1}{2}$ for any value of K, where K=0, K=1, K=2 and K=3. In the example of FIGS. 5A, 5B, 5C, and 5D, the coefficient array of the element function is $-\frac{1}{4}$, $\frac{1}{2}$, and $-\frac{1}{4}$ for any K, where K=0, K=1, K=2, and K=3. In each of these examples, the values and array of coefficients are the same for all of the values of K.

As used herein, an original fundamental operator is a general formula which is used to describe any arbitrary fundamental operator in the fundamental operator series.

In general, an output data array, o(t), is obtained by the convolution of a one-dimensional input data array, i(t), and a fundamental operator, $f_1(t)$, and is mathematically expressed as follows:

$$o(t) = \int_0^t f_1(t - \tau)i(\tau)d\tau \quad (1)$$

When the following relationships exist, $$O(t) = \alpha(\,o(t)\,)$$

$$F_1(s) = \alpha(\,f_1(t)\,) \text{ and}$$
$$I(s) = \alpha(\,i(t)\,);$$

where $\alpha$ represents the Laplace transform, equation (1) can be rewritten as follows:

$$O(s) = F_1(s) \cdot I(s) \quad (2)$$

The convolution of the output data array o(t) thus obtained, with a second fundamental operator $f_2(t)$, corresponds to the multiplication of both terms of equation (2) by $$F_2(s) = \alpha(f_2(t)\,)$$

so that the same result is obtained by the multiplication of I(s) by $$F(s) = F_1(s) \cdot F_2(s)$$

Therefore, it is seen that the result obtained by the convolution of an output data array with the fundamental operators $f_1(t)$ and $f_2(t)$ is equivalent to the result obtained by the convolution of the image data array with an expanded operator that is obtained by the previous convolution of fundamental operators $f_1(t)$ and $f_2(t)$.

It follows, therefore, that when the fundamental operators have n steps, a sequential convolution starting with the convolution of an input image data array with fundamental operator $f_1(t)$ to produce an output data array, which is then convoluted (i.e., convolved) with fundamental operator $f_2(t)$ to produce a second output data array, which is then convoluted with fundamental operator $f_3(t)$ to produce a third output data array, and so on, until convolution of the n-th step is obtained by convolution of the output data array obtained in the previous convolution with fundamental operator $f_n(t)$, is equivalent to the result obtained by the convolution of an initial input image data array with an expanded operator f(t), which expanded operator has been previously obtained by convolving the fundamental operator $f_1(t)$ up to the fundamental operator $f_n(t)$; i.e., f(t) is convolved with $f_2(t)$, which convolved result is convolved with $f_3(t)$, and so on up to $f_n(t)$.

The present invention is based upon this above-described relationship. One object of the invention is, therefore, to provide a space-domain filtering device, used in an image processing system, that requires only a relatively small memory or storage capacity. A second object of the present invention is to provide a space-domain filtering device as used in an image processing system that is capable of executing necessary arithmetic operations at a high speed.

These and other objects of the present invention are realized by providing a filtering device of the type for carrying out a filtering process in a space domain of image data obtained from an external visual image input means and then delivering control information to a controlled driving means, where the filtering device includes fundamental operator generation means for generating fundamental operators within the same fundamental operator series, and filter processing means for convolving the fundamental operators with an image data array. The filtering device further includes a sequential convolution means which includes the fundamental operator generation means and the filter processing means, such that output data obtained by the last convolution of a series of convolutions relating to an initial image data array is used as a new input image data array, and so that the new image data array is convolved with a newly-generated fundamental operator so that the sequential convolution attains the same effect as that attained by directly convoluting the initial data array with an expanded operator.

As one feature, both the fundamental operator generation means and the filter processing means are provided in a code memory, and as another, the generating of the fundamental operators and the filter processing can both be carried out in the same sequence according to a subroutine.

Furthermore, in accordance with another feature, the fundamental operator generation means includes an element function, or one combination of two or more element funcations, that is defined as follows:

$$U(x) = \begin{cases} 1 & (x = 0) \\ 0 & (x \neq 0) \end{cases}$$

where $x = n + K(k)$; where
K(k) is zero or a function of a variable k; and
n is the position of the image data subjected to the filtering processing.

The element function is used to generate an original fundamental operator based upon which the fundamental operators in the same fundamental operator series are generated.

The fundamental operator series can consist of a combination of such element functions, each of which has a coefficient which is a multiple of two.

The fundamental operator series contains one or more integration operators I(n, k), differential operators of the first order $D^{(+)}(n,k)$, and differential operators of the second order $D''D''(n,k)$, each of which is defined in the following manner:

$$I(n,k) = (U(n)/2) + (\tfrac{1}{4})(U(n+2^k) + U(n-2^k)),$$

$$D^{(+)}(n,k) = (\tfrac{1}{2})\,(U(n-2^k) - U(n+2^k)), \text{ and}$$

$$D''(n,k) = (U(n)/2) - (\tfrac{1}{4})\,(U(n+2^k) + U(n-2^k))$$

where k = 0, 1, 2, 3 and so on.

In one embodiment, filter processing in accordance with the apparatus and method of the invention is carried out by a sequential convolution of the fundamental operators with an image data array that is obtained each time by the sequential convolution of the fundamental operators, so as to result in what constitutes an expanded operator that influences the high frequency components (i.e., acts as a low pass filter) contained in the image data, and the succeeding convolution of the fundamental operators constitute expanded operators which, in turn, influence the low frequency component (i.e., act as a high pass filter) which is contained in the image data. The generation of fundamental operators in the same fundamental operator series is carried out by the designation of a variable (k) of the original fundamental operator as an argument (i.e., a variable integer).

The method for carrying out the filtering process in a space domain of image data derived from an external visual image input source, as taught by this invention, includes the steps of storing suitable data in memory storage regions, receiving an initial input image data array from an external visual information input device, and producing signals to selectively activate operational programs stored in memory regions. Fundamental operators are generated within a fundamental operator series, and an image data array is processed by the convolution of a fundamental operator with an image data array. The output of that process produces data, including peak data information, with the output data inputted to a decision means which compares the peak data with predetermined reference data. Depending upon the result of that comparison, the prior steps are repeated with the generation of a fundamental operator and the processing of an image data array in response to predetermined signals so as to produce a sequential series of convolutions, after each one of which peak data is detected as before and a comparison is made between the peak data detected and predetermined reference data, with the output data being transferred to a control drive means if the output data satisfies certain criteria based upon the predetermined reference data.

In using conventional space-domain filtering devices, operators which correspond to the "expanded operators" of the present invention need to be previously prepared, so that the convolution of such previously prepared operators with an initial image data array can be effected. With the filtering device disclosed by this invention, to the contrary, sequentially desired fundamental operators are generated each time in such a way that one fundamental operator is convolved with an image data array, and the output image data array obtained by that convolution is used as a new input image data array which is then convolved with a second fundamental operator, and so on. This procedure produces results equivalent to those obtained in the conventional manner by the convolution of an operator with the same initial input image data array.

The procedure of the present invention requires generation of only a minimum number of original fundamental operators for carrying out the convolution, and those operators are suitably selected (from memory) so that the output data obtained in the previous convolution is convolved with the next suitable operator. As a result, the number of operator generation programs is significantly decreased, and the arithmetic execution time is considerably shortened. Additionally, when a plurality of different fundamental operators in the same fundamental operator series are selected in response to the selection of a variable "k", the necessary storage or memory capacity is still further reduced, along with the arithmetic execution time.

The above and other objects, effects, features and advantages of the present invention will become more fully apparent from the following description of the embodiments of the invention, with reference to the accompanying drawings.

BRIEF DESCRIPTION OF THE DRAWINGS

Each embodiment of the present invention is disclosed with reference to the accompanying drawings in which like reference numerals appear throughout the several views, and wherein:

FIG. 2 is a block diagram illustrating a preferred embodiment of a filtering device in accordance with the present invention;

FIGS. 3A, 3B, 3C and 3D; 4A, 4B, 4C and 4D; and 5A, 5B, 5C and 5D are all views used to explain fundamental operators as used in the filtering device in accordance with the present invention;

FIG. 6 is a flow chart used to explain the mode of operation of the filtering device in accordance with the present invention;

FIGS. 7A, 7B, and 7C; 8A and 8B; and 9B are all views used to explain a process for generating expanded operators.

FIG. 10 is a view used to explain the effects obtained by the present invention;

FIG. 11 is a schematic illustration of an automatic focusing mechanism of a camera using a filtering device in accordance with the present invention;

FIG. 13 is a flow chart used to explain the mode of operation of the camera shown in FIG. 11.

Figure 1:
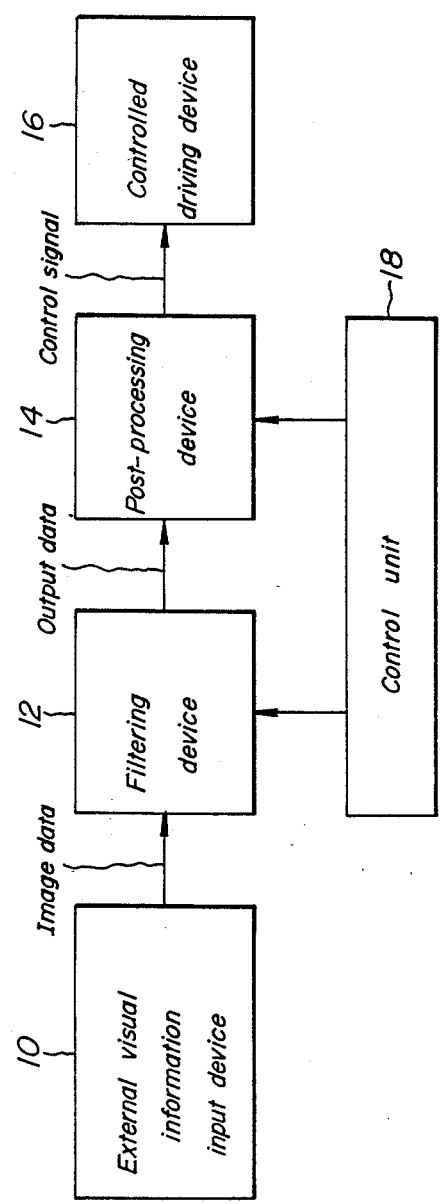
FIG. 1 is a block diagram of an image processing system having a filtering device that is applicable to use with either a conventional filtering device or a filtering device in accordance with the present invention.

DESCRIPTION OF PREFERRED EMBODIMENTS (A) Means for Generation of Fundamental Operators A preferred embodiment of a filter device in accordance with the present invention is shown in the block diagram of FIG. 2. Filtering device 12 is generally indicated by the dotted line, and includes a fundamental operator generation means 20 which is used to generate a plurality of fundamental operators within the same fundamental operator series.

The original fundamental operator is used to produce fundamental operators which are in the same fundamental operator series. A variable integer k is used in the original fundamental operator equation such that the fundamental operators within the series are of the k-th order.

First, the element function is defined by the following function:

$$U(x) = \begin{cases} 1 & (x = 0) \\ 0 & (x \neq 0) \end{cases} \quad (3)$$

where
  $x = n + K(k)$; and,
  $K(k)$ is a function determined by zero or a variable k; and, n represents the position of the image data which is subjected to the filtering process.

The fundamental operators in the series are then obtained from the original fundamental operator by giving a suitable value to the variable k in the original fundamental operator equation, where the variable k represents the spacing between the data bits of the fundamental operator acting upon an image data array. For example, k=0 represents that the fundamental operator acts on the image data array by a one bit spacing; k=1 represents that the fundamental operator acts on the image data array by a two data bit spacing; k=2 represents that the fundamental operator acts on the image data array by a three data bit spacing; k=3 represents that the fundamental operator acts by a four-bit spacing, and so on.

In a filtering device in accordance with the invention, the original fundamental operators, which are different from each other, are represented by one or more combinations of the element functions, and represent the functions of the variable k. For example, three fundamental operators, all different, may be defined by: (a) the integration operator I(n,k); (b) the differential operator of the first order, $D^{(+)}(n,k)$; and (c) the differential operator of the second order, $D''(n,k)$, each of which is further defined in the following discussion:

(1) The integration operator I(n,k) of the k-th order is defined as follows:

$$I(n,k) = AU(n) + B[U(n+K(k)) + U(n-K(k))] \quad (4)$$

where A and B are arbitrary coefficients.

With reference to FIG. 2, this integration operator I(n,k), in which k is a variable integer, is stored in a subroutine code memory region 24 of fundamental operator generation means 20. Variable integer k is stored in a main program memory of filter device 12. When k has various values, then each integration fundamental operator in the integration operator series of the integration operator I(n,k) can be generated from one generation program, i.e., from one common integration operator I(n,k). For example, when the argument variable integer k=1, 2, 3 and so on, the integration result is considered to be "1". In that case, integration operator I(n,k) is given as follows:

$$I(n,k) = (U(n)/2) + (\tfrac{1}{4})[U(n+2^k) + U(n-2^k)] \quad (5)$$

where k=0, 1, 2, 3 (a variable integer), and so on.

An integration operator series is obtained from the above equation by given values of k=0, k=1, k=2, k=3, etc. to the integration operator I(n,k). Each integration fundamental operator within such series appears then as represented in FIGS. 3(A), 3(B), 3(C), and 3(D), where the abscissa axis of each FIG. 3 indicates a position or address "n" at which the convolution of an image data array and a fundamental operator is obtained. The ordinate axis of FIGS. 3(A), 3(B), 3(C) and 3(D) represents relative magnitude.

(2) Similarly, the differential operator of the first order $D^{(+)}(n,k)$, at a k-th position, is defined as follows:

$$D^{(+)}(n,k) = C[U(n-K(k)) - U(n+K(k))] \quad (6)$$

where C is an arbitrary constant.

As in the case of the integration operator I(n,k), the differential operator of the first order $D^{(+)}(n,k)$ is stored in a subroutine code memory region 26 of fundamental operator generation means 20 (see FIG. 2). The argument or variable integer k has values as described earlier, e.g., k=0, 1, 2, etc., and when a value of k is designated, the series of the differential operator $D^{(+)}(n,k)$ of the first order can be generated from one generation program, that is, from one differential operator of the first order, $D^{(+)}(n,k)$.

In order to obtain the integration result of "0", differential operator $D^{(+)}(n,k)$ is defined as follows:

$$D^{(+)}(n,k) = (\tfrac{1}{2})[U(n-2^k) - U(n+2^k)] \quad (7)$$

where k=0, 1, 2, 3 and so on.

Then each differential fundamental operator of the first order contained within the series of differential operators of the first order, for values of k=0, k=1, k=2 and k=3, are positioned as shown in FIGS. 4(A), 4(B), 4(C) and 4(D), where the abscissa axis represents, as before, a position or address "n" at which the convolution between an image data array and a fundamental operator is obtained, while the ordinate axis represents the relative magnitude.

(3) In like manner, the differential operator of the second order $D''(n,k)$ at the k-th position is defined as follows $$D''(n,k) = DU(n) - E[U(n+K(k)) + U(n-K(k))] \quad (8)$$

where D and E are arbitrary constants, respectively

The above equation is stored in memory region 28 in a subroutine code memory. As in the cases of the integration operator I(n,k) and the differential operator of the first order $D^{(+)}(n,k)$, a series of fundamental operators can be generated from a single differential operator of the second order, $D''(n,k)$.

In order to make the result of the integration equal to "1", the operator $D''$ is defined as follows:

$$D''(n,k) = (U(n)/2) - (\tfrac{1}{4})[U(n+2^k) + U(n-2^k)] \quad (9)$$

where K=0, 1, 2, 3 and so on.

A series of fundamental differential operators of the second order is generated from the one common differential operator of the second order, $D''(n,k)$, for k=0, k=1, k=2, k=3, etc., as shown in FIGS. 5(A), 5(B), 5(C), and 5(D). The result of the convolution between an image data series and this fundamental operator is obtained at a position or address "n" along the abscissa axis, while the ordinate axis represents the relative magnitude.

Therefore, from three different kinds of original fundamental operators, a series of fundamental operators can be generated by the generation program that corresponds to each particular fundamental operator series. The original fundamental operators to be used are those as defined above by the equations (5), (7) and (9). The coefficients of the element functions U(n), i.e., A and B of equation (4), C of equation (6), and D and E of equation (8) above, are determined so that each of them is a multiple of two and so that they are not a function of the argument k, i.e., they will not change in response to variations in the argument k.

(B) Apparatus for Filtering, Processing and Decision Making

Filtering device 12 as shown in FIG. 2, according to the present invention, is equipped with a filter processing device 22 which is used to obtain a convolution of each of the fundamental operators produced by the fundamental operator generation means with an image data array. Point "I" of FIG. 2 represents the input of an initial image data array from a visual information input device, such as a camera. Means for carrying out the convolution can be constructed in a known and conventional manner, and therefore no detailed explanation of such means for performing the convolution needs to be separately explained in the specification.

However, in one embodiment of the invention, there is provided a decision means 32 which receives as input the output data convoluted by and delivered from filter processing means 22. Decision means 32 compares the output image data with predetermined reference data or conditions. If the output image data satisfies the predetermined conditions, it is delivered as output from decision means 32 to a post-processing device 14 where it is used in the formation of a control signal. If the output data does not satisfy the predetermined conditions, a new and different fundamental operator to be convoluted is generated. This is done by a signal being sent from decision means 32 as input to fundamental operator generation means 20, along with a value for variable integer k, and at the same time, the output data received by decision means 32 is delivered back as input to filter processing means 22 as the image data array that is to be convolved with the new fundamental operator that is to be generated.

Alternatively and preferably, filter processing device 22 can be designed so that the previous original fundamental operator, and/or variable integer k, can be delivered as output from decision means 32 at a specified point of the fundamental operator generation and filtering process without any decision being made, i.e., without comparison of inputted convolved data with a predetermined condition being made by decision means 32.

(C) Operation of the Filtering Device

The mode of operation of filter processing device 22 will next be described with reference to the flowchart of FIG. 6. For this purpose, and in the interest of simplicity in explanation, the three above-described original fundamental operators, namely, the integration operator, the differential operator of the first order, and the differential operator of the second order, are represented by the letters P, Q and R, respectively. Further, in representing the argument or variable integer k where k=0, 1, 2, 3 and so on, the fundamental operator in each fundamental operator series is represented by adding the subscripts 0, 1, 2, 3, and so on, to P, Q and R, respectively. Accordingly, the integration fundamental operators in the integration fundamental operator series are represented by $P_0$ where k=0, $P_1$ where k=1, $P_2$ where k=2, $P_3$ where k=3, and so on. Likewise, the differential operators of the series generated from the differential operator of the first order are represented by $Q_0$ where k=0, $Q_1$ where k=1, $Q_2$ where k=2, $Q_3$ where k=3, and so on. The differential operators of the series generated from the differential operator of the second order, is represented by $R_0$ where k=0, $R_1$ where k=1, $R_2$ where k=2, $R_3$ where k=3, and so on.

Additional symbols used in the discussion which follow are that convolutions are represented by the symbol "*", and processing steps are represented by the symbol "S". With these representations in mind, the operation of filter processing device 22, as shown in FIG. 2, will be described, with reference to the flowchart of FIG. 6.

An exterior visual information input device, such as a camera, presents a visual image from which an image data array is derived by, for example, a charge coupled device (CCD) applied at equal sampling intervals. The image data array thus produced is either directly, or through temporary storage means, delivered to filter processing means 22 of filtering device 12, as shown in FIG. 2. Point "I" of FIG. 2 represents the input point of an image data array to the filter processing device 22. This initial procedure corresponds to step S1 of FIG. 6, where an image data array is received.

Next, the initial value of variable integer k is set at "0" (step S2 of FIG. 6).

Next, in order to generate the fundamental operators to be convoluted with an image data array i(t), a signal is delivered, either from outside filtering device 12 through an external input terminal 34, or from decision means 32 within the filtering device, as input (point "input" of FIG. 2) to fundamental operator generation means 20 so that one of the three original fundamental operators stored in memory regions 24, 26 and 28, is selected (step S3 of FIG. 6). Assume at this point that the original fundamental operator selected is the integration fundamental operator, represented by P. The fundamental operator $P_0$ is then generated, corresponding to variable integer k having been set to k=0 as one of the fundamental operators in the series of integration fundamental operator P (step S4 of FIG. 6). Fundamental operator $P_0$ is then outputted from generation means 20 and delivered as input to filter processing device 22 (step S5 of FIG. 6). The convolution of fundamental operator $P_0$ with the image date array is then performed by filter processing device 22, which produces a convoluted signal therefrom, designated as output data $O_0(t)$ (step S6 of FIG. 6).

Decision means 32 compares output data $O_0(t)$ with predetermined conditions (step S7 of FIG. 6), and if those conditions are satisfied, output data $O0(t)$ is delivered as output to post-processing device 14 (FIG. 2). If output data $O_0(t)$ fails to satisfy the predetermined conditions, decision means 32 delivers a signal to fundamental operator generation means 20 for a new original fundamental operator, e.g., Q, to be selected, and increments the variable integer from the previous k=0 to k=1, with the new original fundamental operator Q taken from memory and delivered, along with variable integer k=1, to another step within fundamental operator generation means 20. At the same time, output image data array $O_0(t)$ is supplied back by means of a feedback loop as a new input image data array at point "I" to filter processing means 22.

Fundamental operator generation means 20 generates a new fundamental operator $Q_1$ (step S4 of FIG. 6) which is delivered to filter processing means 22 (step S5 of FIG. 6), where convolution occurs between the new input image data array $O_0(t)$ and fundamental operator $Q_1$ (step S6 o FIG. 6)), with the new output data being represented by $O_1(t)$, i.e.:

$$O_1(t) = O_0(t) * Q_1$$

which is equivalent to:

$$O_1(t) = (i(t) * P_0) * Q_1.$$

If output data $O_1(t)$ is found by decision means 32 not to satisfy predetermined conditions, the cycle is repeated for selecting a new original fundamental operator from memory, advancing the value assigned to variable integer k, and using these two steps to generate a new fundamental operator which is then delivered as input to filter processing device 22, and convolved with the output data from the previous convolution cycle. The cycle is repeated as necessary until the predetermined conditions are all satisfied.

Those predetermined conditions could be, for example, a certain degree of contrast sought in the image data, a set deviation of a visual signal from a fixed reference, a certain signal level of the image data, and other conditions relating to the visual input signal.

As presented earlier, the final data obtained by repeating a plurality of cycles in which a new fundamental operator is generated in each cycle, and convolving the same with an image data array obtained as output from the previous cycle, is equivalent to output data obtained by the convolution of an initial image data array with an expanded operator that is obtained by convolving the fundamental operators.

In the operation just described, variable integer k is stored as a part of the main program of the filtering device in a memory, such as a ROM, of the main program 30 (FIG. 2), and the three different original fundamental operators described are stored as subroutines in memory regions, such as a ROM, at items, 24, 26, and 28 of fundamental operator generation means 20. In execution of the main block, a processing series involving generation, convolution and decision making as discussed above can be carried out in one sequence by reading out k and a selected subroutine from memory storage.

(D) Examples of the Expanded Operators

By referring next to FIGS. 7-9, examples of the use of expanded operators for giving output data equivalent to that described in the previous section (C) above, will be described.

FIGS. 7(A), 7(B) and 7(C) are used to explain a procedure for obtaining expanded operators from only the first original fundamental operator used in the preceding description, which is the integration fundamental operator I(n,k), represented by equation (5). FIG. 7(A) shows the integration fundamental operators for values of variable integer k of k=0, k=1 and k=2.

FIG. 7(B) shows what is defined as the expanded integration operator of the first hierarchy which is obtained by the convolution of the integration fundamental operator with k=0, and that with k=1. FIG. 7(C) represents what is defined as the expanded integration operator of the second hierarchy which is obtained by the convolution of the expanded integration operator of the first hierarchy, and the integration fundamental operator with k=2. Output data A obtained by the convolution of the expanded integration operator of the second hierarchy with the initial image data array is equivalent to output data $A_2$ which is obtained by the following successive convolution processing.

First, output data $A_0$, where A represents the original fundamental operator selected and 0 represents its use with variable integer k=0, is obtained by convolving an initial image data array with the integration fundamental operator where k=0. A new output data $A_1$ is then obtained by convolving output data $A_0$ with the integration fundamental operator where k=1. After this, a new output data $A_2$ is obtained by the convolution of output data $A_1$ with the integration fundamental operator where k=2. This procedure of successive convolution processing produces output data $A_2$ that is equivalent to the output data A obtained by the convolution of the expanded integration operator of the second hierarchy with an initial image data array.

When the same and/or different integration fundamental operators are successively convoluted with the previously obtained output data (image data array) repeatedly, a finite number of different expanded integration operators is obtained. This finite number of different expanded integration operator groups, as should be readily apparent to those skilled in the art, functions as a plurality of low-pass filters having fixed cutoff frequencies.

FIG. 8 is a view used to explain the procedure for obtaining the expanded differential operator from the integration fundamental operator I(n,k) and the differential fundamental operator of the first order, $D^{(+)}(n,k)$. In this case, the expanded differential operator is obtained by the convolution of the integration fundamental operator when k=0, with the differential fundamental operator of the first order when k=1, as shown in FIG. 8(A). In this case, output data $B_1$ obtained by successive convolution processing, as has been previously described, is equivalent to an output data obtained by directly convoluting an initial image data array with the expanded differential operator of the first order. This equivalency is shown by the following discussion.

First, output data $B_0$ is obtained by convolving the integration fundamental operator when k=0 with an initial image data array; output data $B_1$ is then obtained by convoluting the differential fundamental operator of the first order when k=1, with the previously obtained output data $B_0$.

FIG. 8(B) illustrates the expanded differential operator of the second hierarchy obtained by the convolution of the integration fundamental operator of the first hierarchy with the differential fundamental operator of the first order when k=2. When the convolution of the integration fundamental operation of the first hierarchy is carried out with the same and/or different differential fundamental operators of the first order, a finite number of expanded differential operators is obtained and, as is apparent to those skilled in the art, a finite number of expanded differential operator groups functions as a plurality of bandpass filters having fixed center frequencies.

Next, FIG. 9 is a view used to explain that a finite number of expanded emphasis operators can be obtained when, in the processes shown in FIG. 8, differential fundamental operators of the second order with k=1 (FIG. 9A) and with k=2 (FIG. 9 B) are used instead of using the differential fundamental operator of the first order with k=2, as was used in the processes of FIG. 8. The finite number of expanded emphasis operator groups thus obtained, as is apparent to those skilled in the art, functions as a plurality of lateral inhibition (sideband suppression) filters having regularly expanded fields.

From the above described-descriptions, it is apparent that the filtering device disclosed by this invention requires only a small number of original fundamental operators to be stored in suitable memory regions, such as ROMs, which original fundamental operators are read from the memory regions, along with an appropriate value of a variable integer k, to generate a fundamental operator in the selected fundamental operator series, and to thereafter have that fundamental operator delivered as input to filter processing means 22 to effect the filtering process. Therefore, when compared to the processes involved with the use of conventional filtering devices, as briefly described above, the required memory capacity in accordance with the present invention is significantly reduced, while the arithmetic operational speed is greatly increased.

It has also been shown that when the coefficients of the element functions are a multiple of 2, as in the cases of the original fundamental operators shown in equations (5), (7) and (9), the arithmetic operations can be executed by only a bit shift so that the number of arithmetic operations required to carry out the filtering process is still further reduced. Furthermore, even though these original fundamental operators have element functions that include the term $2^k$, the efficiency of the arithmetic operations, and the benefits resulting therefrom as previously stated (of arithmetic operational speed and memory capacity reduction), can still be realized with the filtering device according to the invention.

(E) Example of the Arithmetic Operation Number

Use of the arithmetic operation number is described in conjunction with the expanded integration operator of the second hierarchy as illustrated in FIG. 7. FIG. 10 is a view used to explain the arithmetic operation number for the convolution of an image data array with each integration fundamental operator With reference to FIG. 10, an image data series consisting of N bits is represented by item 40 in FIG. 10(A). Consider first the case where the integration fundamental operator with k=0, I(n,0), such as that shown in FIG. 7(A), where k=0, is convoluted with an image data array to obtain an output data. Taking into account the operator of three bits and the desired degree of accuracy in convolution, the convolution is carried out in such a manner that the bit-position of the operator where n=0 is convoluted to all the bits except for the bits at both ends of the image data array, i.e., the first and nth bits, shown as hatched boxes in FIG. 10(A). It follows, therefore, that the operator consists of three bits, while the number of bits of the image data series to be convoluted is (N-2) bits, so that the total number of arithmetic operations in the convolution becomes 3(N-2).

The output data obtained by the convolution processing of FIG. 10(A) is a new input image data array 42, as shown in FIG. 10(B). Therefore, in the case of the convolution of the integration fundamental operator when k=1, such as that shown in FIG. 7(B), the three bit components of this operator appear at three bit-positions spaced apart by two bits, respectively, and accordingly, the arithmetic operations at the bit-position n=0 are carried out from the fourth bit to the (n-3)-th bit of the image data series. In fact, a total of six bits of the image data, that is, the first, second, and third, the (N-2)th, (N-1)th, and Nth, shown hatched in FIG. 10(B), are subjected to the arithmetic operation. However, these six bits of image data are insignificant (if not meaningless), so that data obtained by their convolution is not used. However, in this case, the seven bits from each end of the image data array are meaningless in the convolution, so that data obtained by convolution is not used. Accordingly, since the operator consists of three bits as previously described, while the number of bits of the image data series to be convoluted is (N-6) bits, the total arithmetic operation number in this convolution is 3(N-6).

Next, the convolution of the output data obtained in the manner just described above is presented as a new image data array 44, as shown in FIG. 10(C), and convolution of it with the integration fundamental operator when k=2, as shown in FIG. 7(A), is carried out. In this case, the operator is that in which three bit components thereof appear at three bit-positions spaced apart by four bits, respectively, and in addition, the seven bits from each end of the image data array, as shown by hatched box segments in FIG. 10(C), are subjected to the arithmetic operation. However, in this case, seven bits from each end of the image data array are meaningless in the convolution, so that data obtained by convolution is not used. Therefore, the convolution is carried out from the 8-th to the (N-6)-th bits. Therefore, in accordance with the above-described procedure, the total number of arithmetic operations becomes 3(N-14).

In accordance with the three above-described sequences, the total number, Nc, of arithmetic operations carried out in the above-described three convolutions is:

$$Nc = 3(N-2) + 3(N-6) + 3(N-14)$$
$$= 9N - 66$$

Therefore, in an image data array consisting of 100 bits, i.e., N=100, the total number of arithmetic operations required to be carried out in the convolution process becomes 834.

By way of comparison, in the use of conventional filtering processing of this type involving the convolution of an expanded integration operator of the second order, such as that shown in FIG. 7(C), for an initial image data array 40 as shown in FIG. 10(A), the arithmetic operation number N'c is represented by:

$$N'c = 15N - 210$$

so that when the image data array 40 of FIG. 10(A) consists of 100 bits, the total number of arithmetic operations becomes 1,290, which is higher than the 834 operations that are carried out in the filtering process according to the present invention.

The equation for N'c was determined in an example in which the image data array consists of N bits and the second order operator of 15 bits. As seven bits from both sides of the array are meaningless in convolution processing, convolution will thus be effected from the 8th up to the (N-8)th bits with the 15 bit operator. Accordingly:

$$N'c = 15(N - [2 \times 7])$$
$$= 15(N - 14)$$
$$= 15N - 210$$

From the above descriptions, it is readily seen that using conventional filtering techniques, where an expanded operator is generated every time that a convolution is carried out and is then convoluted with the initial image data array directly, the number of arithmetic operations involved is greater than when an integration fundamental operator I(n,k) is convoluted with an image data array that is previously obtained through a sequential convolution process, with variable integer k ascending in value from a smaller to a larger number. This benefit is even more pronounced with increases in the size of the bits contained in the image data array, i.e., with increased values of N. Furthermore, when the original fundamental operator is comprised of an element function having a coefficient which is a multiple of two, the convolution operation in accordance with this invention is carried out by a number which also is a multiple of two, whereas in the case of conventional frequency filtering techniques, all multiplication steps are still included in the arithmetic operations that are required. Therefore, it is readily understood that the number of arithmetic operations can be remarkably decreased under the disclosure of the present invention, as compared with that required in conventional convolution operations.

(G) Example of Application of the Filtering Device

An example is next given of the application of the filtering device, in accordance with the present invention, to the automatic focusing mechanism of a camera.

FIG. 11 presents a schematic block diagram illustrating the construction of a camera which includes an automatic focusing (AF) system. With reference to FIG. 11, the dotted lines of reference numeral 51 represent a photographic lens, and the dotted lines of reference numeral 81 represent a camera body upon which a photographic lens is mounted.

Photographic lens 51 comprises: (1) a lens system 54 which includes a lens 53 that is movable along an optical axis as part of the automatic focusing function; (2) a transmission drive mechanism 55 comprised of a clutch 55a, a gear 55b, a helicoid screw 55c, and related components by which the transmission drive mechanism transmits a force from a driving source (described below) in the camera body to movable lens 53, so that lens 53 is moved about its optical axis to a proper focusing position; (3) a lens ROM memory storage 57 for storing therein data concerning the lens and the automatic processes of the camera, such as storage of a value of an aperture stop of photographic lens 51, information on the position of movable lens 53, etc.; and (4) an electric contact panel 59 on the side of lens 51 for electrically interconnecting the photographic lens 51 and the camera body 81.

Camera body 81 comprises an optical system that includes a main mirror 83, a sub-mirror 85, a focusing plate 87, a pentagonal prism 89 and other related components. A portion of light transmitted from a subject through the photographic lens is focused on image focusing unit 91. It is preferable that image focusing unit 91 be designed and constructed in accordance with well-known techniques of a focal-point detection system, in which case focusing unit 91 could be a CCD sensor.

Camera body 81 is further equipped with an automatic focusing (AF) control unit (PCU) 93 which serves the two-fold function of controlling image focusing unit 91, and controlling a drive mechanism 95 for driving movable lens 53. Drive mechanism 95 is comprised of AF motor 95a, gear 95b, clutch 95c, and encoder 95d which act in cooperation to control the rotational speed of AF motor 95a which drives or shifts movable lens 53 of photographic lens 51 in accordance with focusing data received from AF control unit (PCU) 93. The driving force from driving mechanism 95 is transmitted through clutch 95c on the side of camera body 81, which interconnects with clutch 55a on the side of photographic lens 51, and through interconnections to movable lens 53 to cause lens 53 to be shifted in one direction or another about its optical axis. The camera is so designed and constructed that motor 95a can rotate at a predetermined constant rotational speed so that movable lens 53 can be shifted along its optical axis at a constant speed.

Camera body 81 is further equipped with photo or light sensors 97a and 97b for Automatic Exposure (AE) control which work in conjunction with an AE control unit (DPU) 97. Camera body 81 also includes a display control unit (IPU) 99, a central processor unit (CPU) 101 which controls AF control unit 93, and which is so designed and constructed so as to control lens memory storage (ROM) 57 on the side of photographic lens 51. Camera body 81 also contains an electric contact panel 103 which corresponds to electric contact panel 59 on the side of lens 51, and provides for transfer of signals from CPU 101 to memory storage 57 by means of these interconnecting contact panels.

In applying the present invention to the AF mechanism in the camera of the type described above, at least filtering device 12, as discussed earlier with reference to FIGS. 1 and 2, and post-processing device 14, as shown in FIG. 1, are incorporated in the central processor unit (CPU) 101. The exterior visual information input device 10 of FIG. 1 corresponds to the optical system components 54, 83 and 85, and image focusing unit 91 comprises a CCD sensor, all as shown in FIG. 11. Controlled driving device 16 of FIG. 1 corresponds to driving mechanism 95 within camera body 81 and transmission drive mechanism 55.

The central processor unit (CPU) 101 includes a main program memory region 30 (FIG. 2) consisting of a ROM as a memory region, and one or more subroutine memory regions 24–28 (also FIG. 2) for generating the fundamental operators and providing input to filter processing device 22. In the subroutine memory regions 24–28 are stored, for example, three original fundamental operators such as those discussed previously, namely, integration operator I(n,k) as expressed in equation (5), differential operator of the first order $D^{(+)}(n,k)$ as expressed by equation (7), and differential operator of the second order $D''(n,k)$ as expressed by equation (9), in such a way that they are freely read out therefrom upon receipt of an appropriate signal from decision means 32. Likewise, variable integer k is stored in main program memory region 30 in such a way that it is freely read out therefrom and inputted to fundamental operator generation means 20 for generation of the fundamental operators.

Figure 12:
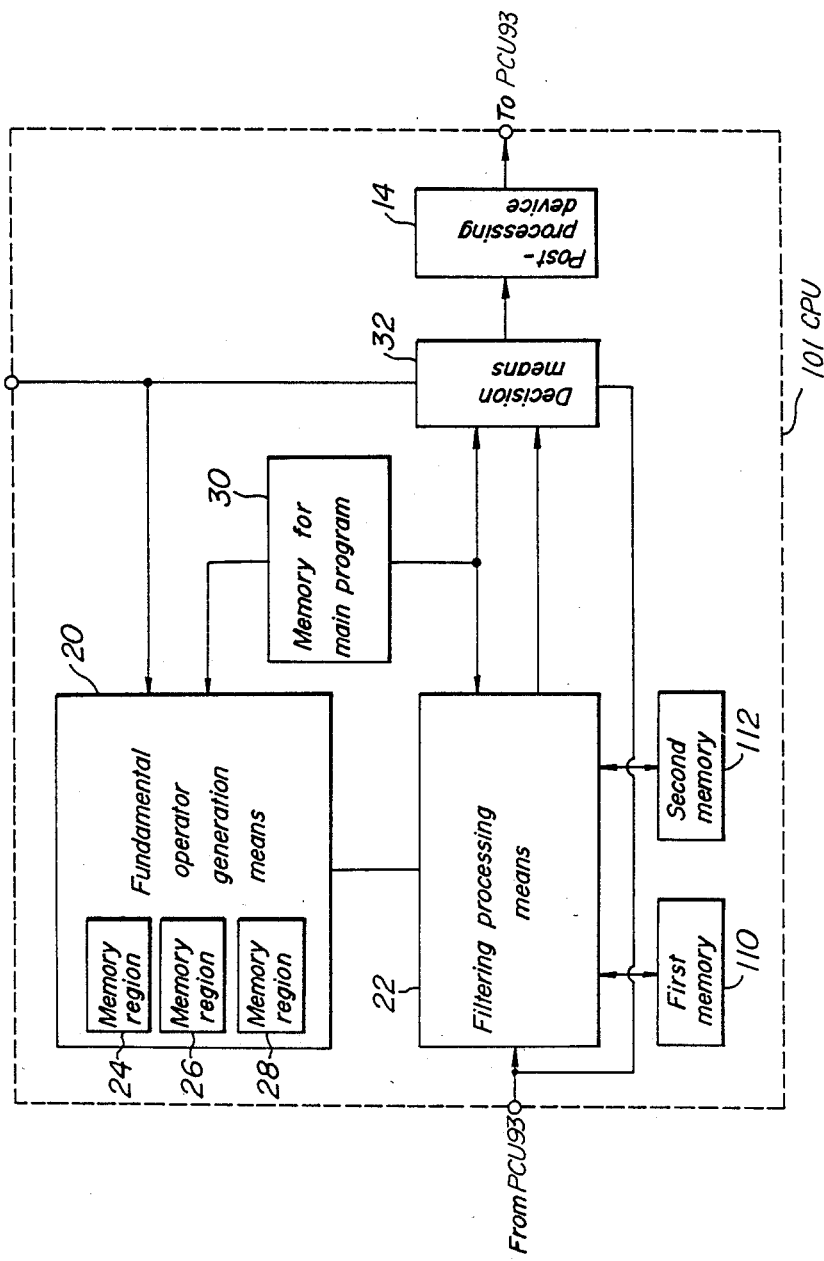
FIG. 12 is a block diagram illustrating the functions of the filtering device in accordance with the present invention as used in the camera automatic focusing mechanism of FIG. 11.

Furthermore, central processor unit (CPU) 101 has a first memory 110 and a second memory 112 (FIG. 12) for temporarily storing data such as image data and/or output data which are produced during the filtering process.

One mode of operation of the invention will now be described with reference to the flowchart of FIG. 13.

High precision focusing is achievable with the present invention, when used in focusing systems for cameras. To achieve the same, AF processing is carried out by using information or data having high frequency components from the spectrum of frequencies included in a visual image. The amplitude of such components is related to the contrast in a picture. Thus, where the amplitude of the frequency components is not large, e.g., where it is equal to or less than the amplitude of the noise level, such components will be harmful to AF processing. By using the present filter processing, therefore, those frequency components which are buried in noise, and which are therefore useless, are to be cut-off or excluded.

In some instances, it may be necessary to eliminate the noise component of the visual image which contains frequency components that are higher than the high-frequency component of the subject. Therefore, in this embodiment a procedure will be described for filter processing from the high-frequency component to the low frequency component of a visual information input.

First, the filtering device is actuated by having the main program sequentially read out from main program memory 30, and concurrently, the initial image data array obtained, through PCU 93, from the CCD sensor of image focusing unit 91, is temporarily stored in a first memory 110 (step S10 of FIG. 13).

Thereafter, initial conditions are set such that the integration operator I(n,k), as an original fundamental operator stored in memory region 24 of fundamental operator generation means 20, is selected either by a suitable external device, such as a keyboard, or is automatically selected by decision means 32 incorporated within filtering device 12, and the variable integer k is set to k=0 (step S12 of FIG. 13).

Next, the program for generation of integration operator I(n,k) at the k-th position is commenced by reading out the original fundamental integration operator from memory region 24, and with k=0, generation means 20 generates the integration fundamental operator as shown in FIG. 3 (A). Thereafter, the initial input image data array is transferred from first memory 110 to filter processing means 22. Concurrently, filter processing means 22 receives the integration fundamental operator from fundamental operator generation means 20 so that the convolution of the initial input image data array and the integration fundamental operator is carried out and the resulting output data is stored in a second memory 112 (step S14 of FIG. 13).

Next, the output data is delivered to decision means 32. In this case, no decision is made by decision means 32 with respect to the output data, and instead, another original fundamental operator, such as differential operator of the second order $D''(n,k)$, is designated and variable integer k is changed to k=1 (step S15 of FIG. 13) which, in turn, is delivered as input to fundamental operator generation means 20. In this instance, where the differential operator of the second order is used as the original fundamental operator, and integer k is incremented by one, there arises the possibility for picking up a signal of the high frequency component due to the lowering of the frequency filtering effectiveness by the filtering device.

The program for generating the differential operator of the second order $D''(n,k)$ is read out, e.g., of memory region 26, so that fundamental operator generation means 20 uses this new original fundamental operator in conjunction with the value k=1, to generate the differential fundamental operator of the second order as shown in FIG. 5 (B), which is then delivered as input to filter processing means 22, which also receives the previously produced image data array as output data from second memory 112. Filter processing means 22 then convolves the image data array developed in the previous convolution with the differential fundamental operator of a second order, with the resulting output data, in the form of a new image data array, being stored in first memory 110 (steps S16 of FIG. 13).

Thereafter, decision means 32 detects or searches the peak value $D''p$ of the output image data array stored in first memory 110 (step S17 of FIG. 13).

Next, decision means 32 determines whether or not the peak value $D''p$ thus detected is higher than a predetermined threshold value C (step S18 of FIG. 13). If the result is "YES", then that indicates that peak $D''p$ has a high-frequency component signal sufficient to be used in the processing of the focusing information, and is not buried in noise. In that case, the image data array is delivered to the AF mechanism via the post-processing device of the succeeding stage 14, of FIG. 1.

On the other hand, if the result is "NO", i.e., if peak value $D''p$ is not higher than a predetermined threshold value C, the peak value of the image data array does not contain a high frequency signal component that can be satisfactorily used as focusing information. Therefore, decision means 32 detects whether or not variable integer k is lower than a previously-defined control number, $k_0$, e.g., $k_0=4$ (step S19 of FIG. 13). If the variable integer k is greater than the control $k_0$, it is impossible to obtain the effective focusing information that is desired, even when the process is repeated. Therefore, the image data array output stored in first memory 110, and the image data array obtained as output data in the previous convolution cycle that is stored in second memory 112, are added together. The sum thus obtained is stored in first memory 110 (step S20 of FIG. 13), and is delivered as output data to the AF device. On the other hand, when variable integer k is lower than control $k_0$, output data stored in second memory 112 is transferred into first memory 110 (step S21 of FIG. 13), and is considered as a new image data array and delivered to filter processing means 22, and the process is returned to step S14 of FIG. 13. However, since variable integer k is set to k=1 at this point, fundamental operator generation means 20 generates the integration fundamental operator shown in FIG. 3(B) which, in turn, is convolved with the image data array from first memory 110 and by filter processing means 22; and the resulting output data, in the form of a new image data array, is stored in second memory 112 (step S14 of FIG. 13).

Next, according to step S15 of FIG. 13, the variable integer k is increased by one to k=2 so that the differential fundamental operator of the second order, as shown in FIG. 5(C), is generated and is convolved with the output data obtained in the previous step S14 by means of filter processing means 22, with the resulting output data therefrom delivered to be stored in first memory 110 (step S16 of FIG. 13). The peak value $D''p$ of the output data obtained at step S16, and stored in first memory 110, is searched (step S17 of FIG. 13) in a manner substantially the same as that described above, and is subjected to step S18 of FIG. 13, which determines whether or not the peak value $D''p$ is higher than a preselected threshold value C. This also determines whether or not peak $D''p$ includes a frequency component that is lower than that obtained in the previous process. If peak value $D''p$ is greater than threshold value C, the output data is sent as useful data to AF processing. If peak value data $D''p$ is not greater than value C, output data is further processed at step S19. If variable integer K is not less than defined control number $K_0$ (step S19), then step S20 is performed to obtain the sum of the data in the first and second memories and to store the resultant sum in the first memory as already described above. The resultant sum is then used as useful output data for the AF processing. Alternatively, if peak value D"p is less than threshold C, but variable integer k is less than defined control number k₀ (step S18 and S19), then step S21 is performed, followed by step S14, and the steps are repeated with a different variable integer k in order to obtain a final output data which is not buried in noise and has a frequency component which is smaller in quantity than that obtained in the previous process, but is sufficient as useful focusing information.

As described above, and in accordance with the flow chart of FIG. 13, a maximum differential value with respect to a frequency included in the processed visual image of a subject is obtained by convoluting the differential fundamental operator of the second order with the previously acquired output image data array. Such a convolution process is sequentially repeated so that output data is obtained that at first has a maximum differential value higher than a predetermined threshold value, with that differentiated value decreasing from a maximum frequency to sequentially lower frequencies by repeating such convolutions and having such useful output data detected and used as a control signal to the AF device of the camera.

Therefore, when the filtering device in accordance with the present invention is used, a subject in which the intensity is successively varied can be automatically focused with a high degree of accuracy, where it can not be focused by conventional fixed differential filtering process techniques.

It is to be understood that the present invention is not limited only to the above-described embodiment, but that various alternative embodiments, as set forth previously herein, and other modifications and variations of the present invention can be effected. For example, the detailed construction of the filtering device in accordance with the present invention can be designed to have other suitable constructions so long as they can accomplish the same or similar function of the filtering device in accordance with the present invention.

Fundamentally, the filtering device disclosed comprises means in which a predetermined original fundamental operator(s) is (are) stored, and from which an original fundamental operator is read out in response to receipt of a value assigned to a variable integer k that is inputted to fundamental operator generation means 20. A fundamental operator is generated in the same series as that of the original fundamental operator stored in memory and is delivered as input to a filter processing device in which the convolution of the generated fundamental operator with an image data array obtained from a prior convolution sequence is carried out, in response to conditions of an output visual image data array.

In the embodiment described for applying the present invention to an AF mechanism of a camera, and in accordance with the flowchart of FIG. 13, the integration operator and the differential operator of the second order are used as the two original fundamental operators. However, it is understood that one operator, or a combination of two or more operators, selected from the integration operator, the differential operator of the first order, and the differential operator of the second order, as have been described and defined herein, as well as other suitable operators, may be equally used in the process and apparatus according to the invention.

Furthermore, instead of using the differential operator of the second order D"(n,k), where $$D^{(-)}(n,k) = -(\tfrac{1}{2})(u(n-2^k) - u(n+2^k))$$

D"(n,k) can be obtained by the sequential convolution of $D^{(+)}(n,k)$ and $D^{(-)}(n,k)$ with the output data.

Also, when $$N(n) = -U(n)$$

is used instead of D"(n,k), then $D^{(-)}(n,k)$ can be obtained by the sequential convolution of $D^{(+)}(n,k)$ and N(n) with the output image data array, so that original fundamental operator $D^{(-)}(n,k)$ and/or N(n) can be used.

It is also to be understood that the present invention is not limited only to the flowcharts shown in FIGS. 6 and 13 of the above-described embodiment of the invention, but that other suitable flowcharts may be used. Such other flowcharts can be constructed depending upon the design and operation of the filtering device in accordance the principles as described in the present invention.

Moreover, the filtering device described can be applied not only to a one-dimensional image data array, but can be equally applied to a two-dimensional image data array when the original fundamental operator or operators are suitably selected.

As has been described herein, a plurality of fundamental operators in the same series as the original fundamental operator can be generated from the original fundamental operator in accordance with only one operator generator program. The first image output data array is obtained by the first convolution of one of the fundamental operators with an initial data array; the second image output data array is obtained by the second convolution of another fundamental operator with the first image output data array; the third output image data array is obtained by a third convolution of another fundamental operator with the second output image data array; and so on, until a final output data array is obtained by continuing such a sequential convolution process of the fundamental operators with the previously developed image output data array. Therefore, the convolution process in accordance with the present invention can obtain the same result as that obtained under conventional methods involving direct convolution of expanded operators with an initial image data array. As a result of the process and apparatus described by this invention, benefits are realized by means of improvements in optical frequency filtering apparatus and processes, such as would be used in the automatic focus and detection mechanism of a camera. Such benefits include:

(1) shortening of the length of codes in a mathematical program;

(2) decreasing the number of multiplication and other mathematical operations so that operational speed is significantly enhanced; and (3) sequentially carrying out the filtering process from a large-quantity to a small quantity of information by the fact that the lower the number assigned to variable integer k, the higher the frequency information included in the data array, so that the process can be carried out from a low integer k position number (covering high-frequency components) to a high integer k position number (covering low frequency signal components). Thus, the filtering device described can eliminate undesired high-frequency noise by filtering out high-frequency components, while obtaining high-frequency information associated with the visual data image array. Thus the filtering device described is best adapted for visual image processing devices such as pattern recognition devices, and focusing and detection mechanisms of cameras.

Although the present invention has been described with respect to a specific embodiment, it should be clear that it is not limited to the specific embodiment listed herein, and that it equally applies to all embodiments covered by the claims, and to all embodiments and modifications which would be within the skill of those of ordinary skill in the art.

What is claimed is:

1. A filtering device for effecting a filtering process in a space-domain of initial image data derived from an external visual image input source, said filtering device comprising:
    (a) fundamental operator generation means for generating fundamental operators within at least one fundamental operator series;
    (b) filter processing means for convolving an initial input image data array and successive input image data arrays with respective fundamental operators to produce successive output image data arrays representative of the convolved input image data arrays;
    (c) means for determining whether each said successive output image data array satisfies at least one predetermined condition; and
    (d) means for selectively sending one of said output image data arrays to a post-filter processing device only when each said predetermined condition is satisfied by said one output image data array.

2. A filtering device in accordance with claim 1, further comprising means for sequentially sending said successive output image data arrays back to said filter processing means as said successive input image data arrays whenever each said predetermined condition is not satisfied by said successive output image data arrays.

3. A filtering device in accordance with claim 2, said filter processing means further comprising means for convolving a different fundamental operator from said series with a different input image data array each time an output image data array is sent back to said filter processing means.

4. A filtering device in accordance with claim 1, further comprising means for sequentially and selectively inputting successive output image data arrays generated by said filter processing means back into said filter processing means as successive input image data arrays, and convolving successive input image data arrays with different fundamental operators from said fundamental operator series.

5. A filtering device in accordance with claim 4, wherein said means for determining whether each of said output image data arrays satisfies at least one predetermined condition further comprises means for selectively inputting each successive output image data array into said filter processing means via a feedback loop.

6. A filtering device in accordance with claim 4, further comprising at least one memory storage region which comprises means for receiving successive output image data arrays from said filter processing means and for selectively inputting successive output image data arrays back into said filter processing means.

7. A filtering device in accordance with claim 4, further comprising at least one memory storage region for receiving said initial input image data array from said filter processing means and for selectively inputting said initial input image data array back into said filter processing means.

8. A filtering device in accordance with claim 1, wherein said fundamental operator generation means comprises a plurality of memory storage regions and means for receiving values representative of a variable integer (k), said memory storage regions comprising means for storing original, fundamental operators.

9. A filtering device in accordance with claim 8, wherein said original fundamental operators comprise at least one of the following: an integration operator $I(n,k)$, a differential operator of the first order $D^{(+)}(n,k)$, and a differential operator of the second order $D''(n,k)$, each of said integration and differential operators being defined, respectively, as:

$$I(n,k)=(U(n)/2)+(\tfrac{1}{4})(U(n+2^k)+U(n-2^k)),$$

$$D^{(+)}(n,k)=(\tfrac{1}{2})[U(n-2^k)-U(n+2^k)], \text{ and}$$

$$D''(n,k)=(U(n)/2)-(\tfrac{1}{4})[U(n+2^k)+U(n-2^k)]$$

where $K=0, 1, 2, 3 \ldots$

10. A filtering device in accordance with claim 8, wherein said fundamental operator generation means comprises means for generating said fundamental operators by using a designated value of integer (k) and selecting one said original fundamental operator from one of said memory storage regions.

11. A filtering device in accordance with claim 1, wherein said fundamental operator generation means further comprises an output terminal for sending said fundamental operators generated by said fundamental operator generation means to said filter processing means.

12. A filtering device in accordance with claim 2, wherein said filter processing means comprises means for sending said output image data arrays to said determining means.

13. A filtering device in accordance with claim 1, said filter processing means comprising at least one input terminal for receiving said initial input image data array from said visual image input source and for receiving output image data arrays from an output image data memory storage region or from said determining means.

14. A filtering device in accordance with claim 1, wherein said determining means comprises means for comparing at least one condition of each of said output image data arrays with respective reference conditions.

15. A filtering device in accordance with claim 14, in combination with said post-filter processing device, said post-filter processing device comprising means for sending a control signal.

16. A filtering device in accordance with claim 15, wherein said control signal is sent to an automatic focus apparatus for a camera.

17. A filtering device in accordance with claim 1, said determining means further comprising means for sending a signal to said fundamental operator generation means, whenever each of said conditions is not satisfied, for selecting an original fundamental operator from a memory storage region in said fundamental operator generation means.

18. A filtering device in accordance with claim 1, further comprising a main program memory comprising means for storing a variable position integer (k), means for sending a signal representative of (k) to said fundamental operator generation means, and means for sending control signals to said filter processing device and to said determining means.

19. A filtering device in accordance with claim 1, in combination with said visual information input source, said source comprising a charge coupled device which is operated at equally spaced sampling intervals.

20. A filtering device in accordance with claim 1, wherein said filter processing means comprises a first memory storage region in which said initial input image data array is stored, and a second memory storage region in which successive output image data arrays are stored.

21. A filtering device in accordance with claim 20, wherein said filter processing means comprises means for selectively placing image data arrays into said first and second memory storage regions, and for recalling said image data arrays from said first and second memory storage regions.

22. A filtering device in accordance with claim 21, wherein said filter processing means comprises means for combining image data arrays stored in said first memory region and in said second memory region.

23. A filtering device in accordance with claim 1, wherein said at least one series of fundamental operators comprises a single series of fundamental operators.

24. A method for effecting a filtering process in a space-domain of an initial image data array derived from an external visual input source, said method comprising:
receiving said initial input image data array in a filter processing device;
generating a plurality of fundamental operators within at least one fundamental operator series;
convolving said initial input image data array with one of said fundamental operators in said filer processing device to produce an initial output image data array;
selectively inputting said initial output data array back into said filter processing device to be convolved with a different one of said fundamental operators by detecting at least one selected condition of said initial output image data array, and determining whether each said selected condition of said output image array satisfies a respective reference condition
generating at least one successive output image data array with said filter processing device and selectively and sequentially sending each successive output image data array, as successive input data arrays, back to said filter processing device, whenever each reference condition is not satisfied by each of said successive output image data arrays;
convolving a different fundamental operator from said fundamental operator series with a successive input image data array each time that a successive output image data array is sent back to said filter processing device;
outputting one of said output image data arrays only when each reference condition is satisfied; and
controlling an automatic focus mechanism of a camera with said signal.

25. A method for effecting a filtering process in a space-domain of an initial image data array derived from an external visual input source, said method comprising:
receiving said initial input image data array in a filter processing device;
generating a plurality of fundamental operators within at least one fundamental operator series;
convolving said initial input image data array with one of said fundamental operators in said filter processing device to produce an initial output image data array;
selectively inputting said initial output image data array back into said filter processing device to be convolved with a different one of said fundamental operators wherein said fundamental operators are generated by generating an original fundamental operator based upon at least one of the following element functions:

$$U(x) = \begin{cases} 1 & (x = 0) \\ 0 & (x \neq 0) \end{cases}$$

where $x = n + K(k)$, $K(k)$ being zero or a function of a variable k and n being the position of image data which has been convolved, wherein all of the fundamental operators in said fundamental operator series are based upon said original fundamental operators, said fundamental operator series containing at least one of the following:
(a) an integration operator I(n,k) defined as:

$$I(n,k) = (U(n/2) + (\tfrac{1}{4})\,[U(n+2^k) + U(n-2^k)];\ \text{or}$$

(b) a first order differential operator $D^{(+)}(n,k)$ defined as:

$$D^{(+)}(n,k) = (\tfrac{1}{2})\,[U(n-2^k) - U(n+2^k)];\ \text{or}$$

(c) a second order differential operator D''(n,k) defined as:

$$D''(n,k) = (U(n)/2) - (\tfrac{1}{4})\,[U(n+2^k) + U(n-2^k)]$$

where k = 0, 1, 2, 3.

26. A filtering device for effecting a filtering process in a space domain of image data derived from an external visual image input means, said device being adapted to deliver control information to a controlled driving means, said filtering device comprising;
means for generating an original fundamental operator;
filter processing means for convolving an initial input image data array and successive input image data arrays with respective fundamental operators to produce respective output image data arrays; and
means for sequentially convolving each input image data array by sequentially and selectively inputting successive output image data arrays from said filter processing means back into said filter processing means as said successive input image data arrays and by convolving each successive input image data array input back into said filter processing means with a different fundamental operator from said fundamental operator series, wherein said original fundamental operator is based upon at least one of the following element functions;

$$U(x) = \begin{cases} 1 & (x = 0) \\ 0 & (x \neq 0) \end{cases}$$

where $x = n + K(k)$, $K(k)$ being zero or a function of a variable k and n being the position of image data subjected to a filtering process, all fundamental operators in a single fundamental operator series being generated from said original fundamental operator, said original fundamental operator consisting of at least one of an integration operator $I(n,k)$, a differential operator of the first order $D^{(+)}(n,k)$, a differential operator of the second order $D''(n,k)$, with each of said integration and differential operators being defined below, respectively, as:

$I(n,k) = (U(n/2) + (\frac{1}{2})(U(n+2^k) + U(n-2^k))$, and $D^{(+)}(n,k) = (\frac{1}{2})(U(n-2^k) - U(n+2^k))$, and $D''(n,k) = (U(n)/2) - (\frac{1}{2})(U(n+2^k) + U(n-2^k))$ where k = 0, 1, 2, 3.

* * * * *

UNITED STATES PATENT AND TRADEMARK OFFICE
CERTIFICATE OF CORRECTION

PATENT NO. : 4,908,644
DATED : March 13, 1990
INVENTOR(S) : O. SHINDO et al.

It is certified that error appears in the above-indentified patent and that said Letters Patent is hereby corrected as shown below:

At column 22, line 39, (claim 12, line 1), change "2" to ---1---.

At column 23, line 38, (claim 24, line 10), change "filer" to ---filter---.

At column 23, line 48, (claim 24, line 10), insert ---;--- after "condition".

At column 24, line 32, (claim 25, line 36), "(U(n/2)" should be ---(U(n)/2)---.

At column 24, line 45, (claim 25, line 49), after "3", change "." to ---...---.

At column 26, line 7, (claim 26, line 43), change "(U(n/2)" to ---(U(n)/2)---.

At column 26, line 13, (claim 26, line 47), after "3", change "." to ---...---.

At column 4, line 52, delete "D" (second occurrence).

Signed and Sealed this

Fourteenth Day of June, 1994

Attest:

BRUCE LEHMAN

*Attesting Officer*     *Commissioner of Patents and Trademarks*